United States Patent
Chen et al.

(10) Patent No.: US 9,544,713 B2
(45) Date of Patent: Jan. 10, 2017

(54) USING BLUETOOTH LOW ENERGY

(75) Inventors: Canfeng Chen, Beijing (CN); Jia Liu, Beijing (CN); Kanji Kerai, London (GB); Xin Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/422,820

(22) PCT Filed: Aug. 31, 2012

(86) PCT No.: PCT/CN2012/080852
§ 371 (c)(1),
(2), (4) Date: Feb. 20, 2015

(87) PCT Pub. No.: WO2014/032278
PCT Pub. Date: Mar. 6, 2014

(65) Prior Publication Data
US 2015/0245165 A1    Aug. 27, 2015

(51) Int. Cl.
*H04M 1/00* (2006.01)
*H04W 4/00* (2009.01)
(Continued)

(52) U.S. Cl.
CPC ............ *H04W 4/008* (2013.01); *G06F 1/3253* (2013.01); *H04L 69/14* (2013.01); *H04L 69/18* (2013.01);
(Continued)

(58) Field of Classification Search
CPC .... H04W 76/277; H04W 48/16; H04W 4/228; G06F 1/3253
(Continued)

(56) References Cited

U.S. PATENT DOCUMENTS

2010/0317289 A1*  12/2010  Desai .................. H04B 17/318
                                                              455/41.2
2011/0212746 A1    9/2011  Sarkar et al.
(Continued)

FOREIGN PATENT DOCUMENTS

CN          1843004       10/2006
CN       101109954 A       1/2008
(Continued)

OTHER PUBLICATIONS

International Search Report and Written Opinion received for corresponding Patent Cooperation Treaty Application No. PCT/CN2012/080852, dated Jun. 13, 2013, 10 pages.
(Continued)

*Primary Examiner* — Ping Hsieh
(74) *Attorney, Agent, or Firm* — Locke Lord LLP

(57) ABSTRACT

A method is described, the method comprising scanning for a Bluetooth Low Energy data signal, and if a Bluetooth Low Energy data signal is detected, responding to detection of the Bluetooth Low Energy data signal by suspending the performance of wireless network discovery procedures in respect of at least one network operating using a protocol other than Bluetooth Low Energy. Also described is a method comprising causing generation and transmission of a Bluetooth Low Energy data signal, the generated and transmitted Bluetooth Low Energy data signal indicating the absence of at least one network which operates using a protocol other than Bluetooth Low Energy. Also described are apparatus, computer-readable code, and non-transitory computer-readable memory media having computer readable code stored thereon for causing performance of one or both of the methods.

20 Claims, 4 Drawing Sheets

(51) Int. Cl.
*G06F 1/32* (2006.01)
*H04W 48/16* (2009.01)
*H04W 76/02* (2009.01)
*H04W 48/08* (2009.01)
*H04W 88/06* (2009.01)
*H04L 29/06* (2006.01)
*H04W 52/02* (2009.01)

(52) U.S. Cl.
CPC ............. *H04W 48/08* (2013.01); *H04W 48/16* (2013.01); *H04W 52/0235* (2013.01); *H04W 76/027* (2013.01); *H04W 88/06* (2013.01); *Y02B 60/1235* (2013.01)

(58) Field of Classification Search
USPC .................................. 455/574, 552.1, 456.4
See application file for complete search history.

(56) References Cited

U.S. PATENT DOCUMENTS

2012/0214533 A1   8/2012   Bakthavathsalu et al.
2013/0331092 A1*  12/2013  Ishii ...................... H04W 48/16
                                                              455/426.1
2014/0286321 A1*  9/2014   Balian ................... H04W 12/06
                                                              370/338

FOREIGN PATENT DOCUMENTS

| CN | 102474279 | 5/2012 |
| EP | 2418780 | 2/2012 |
| WO | WO2012076405 | 6/2012 |
| WO | WO2012111341 | 8/2012 |

OTHER PUBLICATIONS

Extended European Search Report for European Patent Application No. 12883682.2, Dated Aug. 18, 2016, 12 pages.
English Language Machine Translation of International Application Publication No. WO2012111341, 11 pages.
English Language Machine Translation of Chinese Patent Publication No. CN101109954A, Published on Jan. 23, 2008, 14 pages.
Chinese Office Action Search Report dated Sep. 21, 2016, 2 pages.

* cited by examiner

USING BLUETOOTH LOW ENERGY

RELATED APPLICATION

This application was originally filed as PCT Application No. PCT/CN2012/080852 filed Aug. 31, 2012.

FIELD

The invention relates to the use of Bluetooth Low Energy.

BACKGROUND

Power consumption is an important consideration when designing hardware and software for portable electronic devices, such as mobile telephones.

Bluetooth Low Energy is now part of the Bluetooth Specification and provides significant benefits with regards to power consumption compared to previous versions of Bluetooth.

SUMMARY

In a first aspect, this specification describes a method comprising scanning for a Bluetooth Low Energy data signal, and if a Bluetooth Low Energy data signal is detected, responding to detection of the Bluetooth Low Energy data signal by suspending the performance of wireless network discovery procedures in respect of at least one network operating using a protocol other than Bluetooth Low Energy. The Bluetooth Low Energy data signal may indicate the absence of the at least one network.

The method may comprise examining the Bluetooth Low Energy data signal for the presence of a parameter, the parameter indicating the absence of at least one network, and suspending the performance of network discovery procedures only if the parameter is present in the data signal and indicates the absence of a network with which a connection is permitted.

The method may comprise scanning for the Bluetooth Low Energy data signal in response to a failure to connect to a network following performance of a network discovery procedure in respect of the at least one network.

The method may comprise if a Bluetooth Low Energy data signal is not detected, causing performance of a wireless network discovery procedure in respect of at least one network operating using a protocol other than Bluetooth Low Energy. The method may comprise responding to a failure to connect to a network following the performance of the network discovery procedure by causing generation and transmission of a Bluetooth Low Energy data signal, the transmitted Bluetooth Low Energy data signal indicating absence of the at least one network.

The method may comprise subsequent to suspending the performance of wireless network discovery procedures, responding to detection of a subsequent Bluetooth Low Energy data signal indicating the presence of the at least one network by causing performance of a network discovery procedure in respect of the at least one network.

The method may comprise subsequent to suspending the performance of wireless network discovery procedures, responding to expiration of a duration by causing performance of a network discovery procedure in respect of the at least one network.

Each network discovery procedure may be a random access procedure in respect of at least one cellular network.

In a second aspect, this specification describes a method comprising causing generation and transmission of a Bluetooth Low Energy data signal, the generated and transmitted Bluetooth Low Energy data signal indicating the absence of at least one network which operates using a protocol other than Bluetooth Low Energy. The generation and transmission of the Bluetooth Low Energy data signal may be caused in response to a determination, based on an unsuccessful network discovery procedure, that the at least one network, which operates using a protocol other than Bluetooth Low Energy, is absent.

In a third aspect, this specification describes apparatus comprising at least one processor and at least one non-transitory memory medium, the at least one non-transitory memory medium having stored thereon computer-executable code which, when executed by the at least one processor, causes the apparatus to cause a scan for a Bluetooth Low Energy data signal to be performed, and if a Bluetooth Low Energy data signal is detected, to respond to detection of the Bluetooth Low Energy data signal by causing suspension of the performance of wireless network discovery procedures in respect of at least one network operating using a protocol other than Bluetooth Low Energy. The Bluetooth Low Energy data signal may indicate the absence of the at least one network.

The computer-executable code, when executed by the at least one processor, may cause the apparatus to examine the Bluetooth Low Energy data signal for the presence of a parameter, the parameter indicating the absence of at least one network, and to suspend the performance of network discovery procedures only if the parameter is present in the data signal and indicates the absence of a network with which a connection is permitted.

The computer-executable code, when executed by the at least one processor, may cause the apparatus to cause the scan for the Bluetooth Low Energy data signal to be performed in response to a failure to connect to a network following performance of a network discovery procedure in respect of the at least one network.

The computer-executable code, when executed by the at least one processor, may cause the apparatus, if a Bluetooth Low Energy data signal is not detected, to cause performance of a wireless network discovery procedure in respect of at least one network operating using a protocol other than Bluetooth Low Energy. The computer-executable code, when executed by the at least one processor, may cause the apparatus to respond to a failure to connect to a network following the performance of the network discovery procedure by causing generation and transmission of a Bluetooth Low Energy data signal, the transmitted Bluetooth Low Energy data signal indicating absence of the at least one network.

The computer-executable code, when executed by the at least one processor, may cause the apparatus, subsequent to suspending the performance of wireless network discovery procedures, to respond to detection of a subsequent Bluetooth Low Energy data signal indicating the presence of the at least one network by causing performance of a network discovery procedure in respect of the at least one network.

The computer-executable code, when executed by the at least one processor, may cause the apparatus, subsequent to suspending the performance of wireless network discovery procedures, to respond to expiration of a duration by causing performance of a network discovery procedure in respect of the at least one network.

Each network discovery procedure may be a random access procedure in respect of at least one cellular network.

In a fourth aspect, this specification describes apparatus comprising at least one processor and at least one non-transitory memory medium, the at least one non-transitory memory medium having stored thereon computer-executable code which, when executed by the at least one processor, causes the apparatus to cause generation and transmission of a Bluetooth Low Energy data signal, the generated and transmitted Bluetooth Low Energy data signal indicating the absence of at least one network which operates using a protocol other than Bluetooth Low Energy. The computer-executable code, when executed by the at least one processor, may cause the apparatus to cause the generation and transmission of the Bluetooth Low Energy data signal in response to a determination, based on an unsuccessful network discovery procedure, that the at least one network, which operates using a protocol other than Bluetooth Low Energy, is absent.

In a fifth aspect, this specification describes computer-readable code which, when executed by computer apparatus, causes the computer apparatus to perform a method according to either of the first or second aspects.

In a sixth aspect, this specification describes at least one non-transitory computer-readable medium having computer-readable instructions stored thereon, the computer-readable instructions, when executed by at least one processor, causing the at least one processor to cause a scan for a Bluetooth Low Energy data signal to be performed, and, if a Bluetooth Low Energy data signal is detected, to respond to detection of the Bluetooth Low Energy data signal by causing suspension of the performance of wireless network discovery procedures in respect of at least one network operating using a protocol other than Bluetooth Low Energy.

In a seventh aspect, this specification describes at least one non-transitory computer-readable medium having computer-readable instructions stored thereon, the computer-readable instructions, when executed by at least one processor, causing the at least one processor to cause generation and transmission of a Bluetooth Low Energy data signal, the generated and transmitted Bluetooth Low Energy data signal indicating the absence of at least one network which operates using a protocol other than Bluetooth Low Energy.

In an eighth aspect, this specification describes apparatus comprising means for causing a scan for a Bluetooth Low Energy data signal to be performed, and means for responding to detection of a Bluetooth Low Energy data signal, if a Bluetooth Low Energy data signal is detected, by suspending the performance of wireless network discovery procedures in respect of at least one network operating using a protocol other than Bluetooth Low Energy. The apparatus may also comprise means for performing other operations as described with reference to the first aspect.

In a ninth aspect, this specification describes apparatus comprising means for causing generation and transmission of a Bluetooth Low Energy data signal, the generated and transmitted Bluetooth Low Energy data signal indicating the absence of at least one network which operates using a protocol other than Bluetooth Low Energy. The apparatus may comprise means for causing the generation and transmission of the Bluetooth Low Energy data signal in response to a determination, based on an unsuccessful network discovery procedure, that the at least one network, which operates using a protocol other than Bluetooth Low Energy, is absent.

In a tenth aspect, this specification describes apparatus configured to cause a scan for a Bluetooth Low Energy data signal to be performed, and, if a Bluetooth Low Energy data signal is detected, to respond to detection of the Bluetooth Low Energy data signal by causing suspension of the performance of wireless network discovery procedures in respect of at least one network operating using a protocol other than Bluetooth Low Energy In an eleventh aspect, this specification describes apparatus configured to cause generation and transmission of a Bluetooth Low Energy data signal, the generated and transmitted Bluetooth Low Energy data signal indicating the absence of at least one network which operates using a protocol other than Bluetooth Low Energy.

BRIEF DESCRIPTION OF THE FIGURES

For a more complete understanding of example embodiments, reference is now made to the following description taken in connection with the accompanying drawings in which.

DETAILED DESCRIPTION OF EXAMPLE EMBODIMENTS

Figure 1:
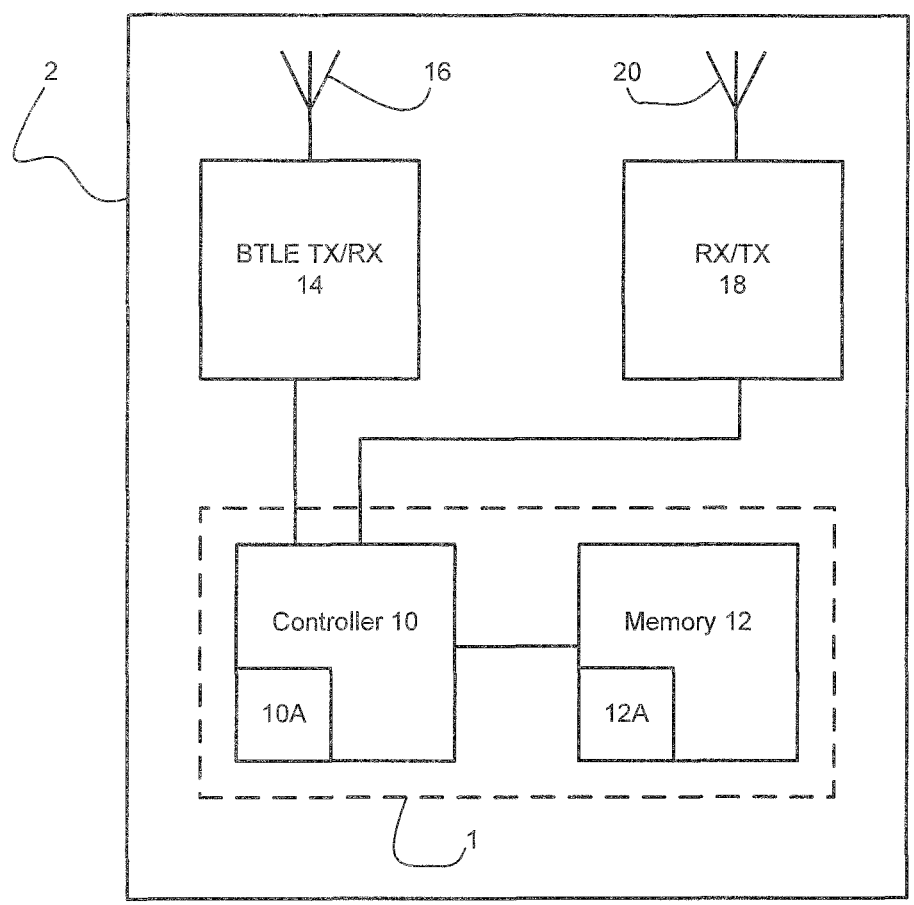
FIG. 1 is a schematic diagram of a mobile device according to example embodiments.

In the description and drawings, like reference numerals refer to like elements throughout.

FIG. 1 is a schematic illustration of a device 2 according to example embodiments. The device 2 comprises apparatus 1 comprising a controller 10 and at least one non-transitory memory medium 12. The device 2 also comprises Bluetooth Low Energy (BTLE) transceiver circuitry 14 and an associated antenna 16. The BTLE transceiver circuitry 14 and antenna 16 are operable to send and receive BTLE data signals. The way in which this is performed is known in the art and is described, for example, in "Specification of the Bluetooth System" Version 4.0, Volume 6 (published 30 Jun. 2010). In addition, the device 2 comprises second transceiver circuitry 18 and an associated antenna 20. The second transceiver circuitry 18 is operable to allow wireless communication with a network which operates using a protocol other than BTLE. In some specific examples, the second transceiver circuitry is operable to allow communication with a cellular data network, such as a 3G or 4G cellular data network.

The device 2 may be any device that is capable of communicating via BTLE and another type of wireless communication protocol. Typically, the device 2 is a portable device. The device 2 may be a mobile terminal, such as a smartphone or other type of mobile telephone. The device may also be, for example, a music player, a tablet computer, a laptop computer, an e-reader or a positioning device.

The apparatus 1 comprises a controller 10 and at least one non-transitory memory medium 12. The controller 10 comprises at least one processor 10A which is operable to execute computer readable code 12A stored in the at least one memory 12. The controller 10 is operable, under the control of the computer readable code 12A to control the other components of the device 2. The at least one processor 10A may comprise any suitable type, or any combination of suitable types, of processor or microprocessor. The controller 10 may also comprise one or more application specific integrated circuits (not shown). The at least one memory 12 may comprise any suitable type, or any combination of suitable types of memory medium. Suitable types of memory medium include, but are not limited to ROM, RAM and flash memory.

The controller 10 is operable to cause the BTLE transceiver circuitry 14 and antenna 16 to generate and transmit BTLE data signals. In addition, the controller 10 is operable to cause the BTLE transceiver circuitry 14 to scan for BTLE data signals being transmitted from other devices (not shown in FIG. 1). The controller 10 is operable to control the second transceiver circuitry 18 to perform network discovery procedures in an attempt to establish a connection to a network. If a suitable network is discovered the controller is operable to use the second transceiver circuitry 18 to establish a wireless connection with the discovered network.

In examples in which the second transceiver circuitry 18 operates using the 3G or 4G cellular data network protocols, a network discovery procedure comprises a Random Access (RA) procedure. An RA procedure includes a series of Random Access Preamble (RAP) transmissions and Random Access Response (RAR) listening operations. More information about the RA procedure can be found in, for example, the following documents: 3GTS 36.300, Section 10.1.5, which provides an overall description of the RA Procedure; 3GPP 36.321, section 5.1, which describes the MAC Procedure and the Random Access Procedure; 3GTS 36.213, Section 6, which describes the Physical Layer Procedure related to the RA Procedure; and 3GTS 36.211, Section 5.7, which describes Radio Resource Control (RRC) Messages and Information Elements (IE) that are involved in the RA Procedure.

An RA procedure may finish in one of two ways. Either a correct RAR is successfully received, in which case a procedure for establishing a connection to the network is performed or, if a correct RAR is not successfully received, a Preamble Transfer Counter, which is incremented each time a RAP transmission is performed, reaches a threshold. If the threshold is reached, the MAC layer indicates an RA problem to the upper layers of the protocol stack. After this, the device may wait for a short time before re-attempting connection. If a cellular network is not present and so a correct RAR is not received, a number of RA procedures are performed before the threshold is reached. This is a drain on the battery (not shown) of the device 2. In 4G (or Long Term Evolution as it is also known), connection with a network can be carried out using one of many possible bands. As such, when attempting a connection, the device may search on each of the bands. This can take a long time and can be a drain on the power supply of the device, particularly if no network is present.

Example embodiments of the invention are configured to reduce the amount of battery power that is used when a particular network, such a cellular data network, is not available. A cellular data network may be unavailable, for example, when the device 2 is outside a coverage area of a particular network, or when the device 2 is in a location when no cellular data network is available, such as a basement, a tunnel, an underground transit system, an elevator or an aeroplane.

According to example embodiments, the apparatus 1 is configured to utilise the BTLE transceiver 14 to scan for a BTLE data signal. The apparatus 1 is further configured, if a Bluetooth Low Energy data signal is detected, to respond to the detection of the Bluetooth Low Energy data signal by suspending the performance of wireless network discovery procedures in respect of at least one network operating using a protocol other than Bluetooth Low Energy. In this way, battery power can be conserved by preventing performance of network discovery procedures which, due to the absence of network coverage, cannot end in a successful connection to a network.

The detected BTLE data signal may be transmitted by a dedicated device that may be located in, or at the entrance to, an area in which there is no coverage by a particular wireless network. The BTLE data signal includes a parameter which indicates the absence of network coverage by one or more networks. In some examples, the dedicated device may be configured to emit a BTLE signal which indicates a lack of coverage by one or more networks at intervals of, for example, 100 ms to 500 ms. In some examples, the interval may be approximately 200 ms. In other examples, a different interval may be used. BTLE signals are particularly suitable for advertising the absence of cellular networks due to its relatively short range, its low cost, its ubiquitous nature, and the low power consumption associated with both transmission and discovery of BTLE signals.

The apparatus 1 is configured to examine the detected BTLE data signal for the presence of a parameter. The apparatus 1 is configured to suspend the performance of network discovery procedures only if the parameter, which indicates the absence of one or more networks with which the apparatus is associated, is present in the BTLE signal. Apparatus may be associated with a particular network if the apparatus is permitted to connect with the network. If the device 2/apparatus 1 is permitted to connect to any one of plural networks, the apparatus may suspend the network discovery procedures only if the parameter in the detected signal indicates that all of the networks to which the device is permitted to connect are absent.

In some example embodiments, the parameter is an octet present in the BTLE data signal. Specifically, example embodiments utilise BTU's advertising capability to provide a new type of advertisement for indicating the absence of network coverage by one or more networks. In the case of a cellular network, the signal advertisement data (AD) type which provides such an indication may be referred to as a Cellular Coverage Broadcast (CCB) AD type. The CCB AD type may be used to indicate the availability (or otherwise) of one or more cellular networks. The format of the CCB AD type may follow the specification of the General Access Profile (GAP). For example, the format may be as shown in Table 1, below:

TABLE 1

| Value | Description | Information |
| --- | --- | --- |
| 0x20 (or another currently unused number) | Cellular Coverage Broadcast (CCB) (1 octet) | The first octet - RAR Indication (RI) 0x00 - not used 0x01 - no reception by operator A 0x02 - no reception by operator B 0x04 - no reception by operator C 0x08 - no reception by operator D 0x10 - no reception by operator E 0xFF - DO NOT USE CELLULAR |

The CCB may be encapsulated in a non-connectable undirected advertising event (ADV_NONCONN_IND) protocol data unit (PDU). More information about this type of PDU can be found in the "Specification of the Bluetooth System" Version 4.0, Volume 6, Part B, section 2.3. A BTLE signal which includes a CCB parameter may be referred to as a CCB BTLE signal.

The example of Table 1 allows a single octet to be used to indicate any combination of networks that are unavailable. For example, if the first bit in the octet is a "one", it can be determined that there is no coverage from Operator A's network. Similarly, if the third bit in the octet is a "one", it can be determined that Operator C's network is currently not available. If both of the first and third bits of the octet are "ones", it can be determined that Operator A's network and Operator C's network are unavailable. If all bits of the octet are "ones", it can be determined that all networks are unavailable.

If a BTLE data signal is not detected during the scan, the controller 10 is configured to cause performance of a wireless network discovery procedure in respect of at least one network operating using a protocol other than BTLE. Similarly, the controller 10 is configured to cause performance of a wireless network discovery procedure if a BTLE signal is detected but no CCB parameter is present. Likewise, the controller 10 is configured to cause performance of a wireless network discovery procedure in the event that a CCB parameter is present in the BTLE signal, but does not indicate the absence of a network, with which the device is associated. As discussed above, in example embodiments in which the at least one network is a cellular network, the wireless network discovery procedure comprises an RA procedure.

In some embodiments, the controller 10 may cause the performance of the scan for a BTLE signal in response to a network discovery procedure after which no network connection could be established (also referred to as an unsuccessful network discovery procedure). In the cellular network example, the controller 10 may cause a switch to scanning for BTLE if no correct RAR is received in response to an RAP transmission. In other embodiments, the controller 10 may scan for BTLE data signals before performing the network discovery procedure in respect of, for example, a cellular network.

After suspending the performance of wireless network discovery procedures, the controller 10 may continue to scan periodically for BTLE signals. The controller to is configured to respond to the detection of a BTLE signal, which indicates the presence of an associated network, by causing the performance of a wireless network discovery procedure. It will be appreciated that the BTLE signal may indicate the presence of a particular network using the CCB parameter described above. As such, a subsequently received BTLE signal may, in fact, indicate that coverage by a particular network is no longer absent. From this the controller 10 is able to determine that coverage by a particular network is present.

The controller 10 may also or alternatively be configured to respond to a determination that a predetermined duration has elapsed since the network discovery procedures were initially suspended by causing performance of a network discovery procedure. For example, a timer may be started in response to receipt of the BTLE signal indicating the absence of network coverage by a particular network. The controller 10 may then respond to expiry of this timer by causing a network discovery procedure to be performed. In this way it is possible to avoid rogue or malicious BTLE signals preventing connection to a network. It will of course be appreciated that the determination of the duration having elapsed may be carried out in any suitable way. The predetermined duration may be, for example, in the range of one to five minutes. Hysteresis may be applied to the duration for which network discovery procedures are suspended. As such, the state of the system prior to receiving the BTLE signal is taken into account when determining the predetermined duration. For example, if a connection was possible immediately prior to receiving the BTLE signal, the duration may be shorter than if a network connection was not possible before receiving the BTLE signal.

In some embodiments, the controller 10 may be responsive to a failure to connect to a network following the performance of a network discovery procedure by causing generation and transmission of a Bluetooth Low Energy data signal, the transmitted Bluetooth Low Energy data signal indicating absence of the network with which connection was failed. A second terminal may respond to receipt of the transmitted signal by suspending network discovery procedures as described above. In other words, if the absence of network coverage prevents connection to a network, the controller 10 causes a BTLE signal to be generated and transmitted thereby to inform other mobile terminals regarding of the absence of the network coverage. The generated BTLE signal may indicate the absence of one or more different networks. The generated BTLE signal may include a CCB parameter as described above. In some examples, the controller 10 may be configured to transmit a BTLE signal including the CCB parameter at intervals of, for example, 10 ms to 50 ms for a duration of, for example, 100 ms to 500 ms. In some examples, the controller may transmit a BTLE signal including the CCB parameter at intervals of 20 ms for a duration of no longer than 200 ms. By enabling mobile terminals to inform one another about the absence of network coverage, there may be no need, or a reduced need, for a fixed infrastructure to be installed in order to implement example embodiments.

Example embodiments are such that existing mobile devices which are BTLE capable can be modified by a software update only to produce a device which operates in accordance with example embodiments. In addition, example embodiments described herein are compatible with existing standards regarding 3GPP networks as well as the existing Bluetooth specification.

Figure 2:
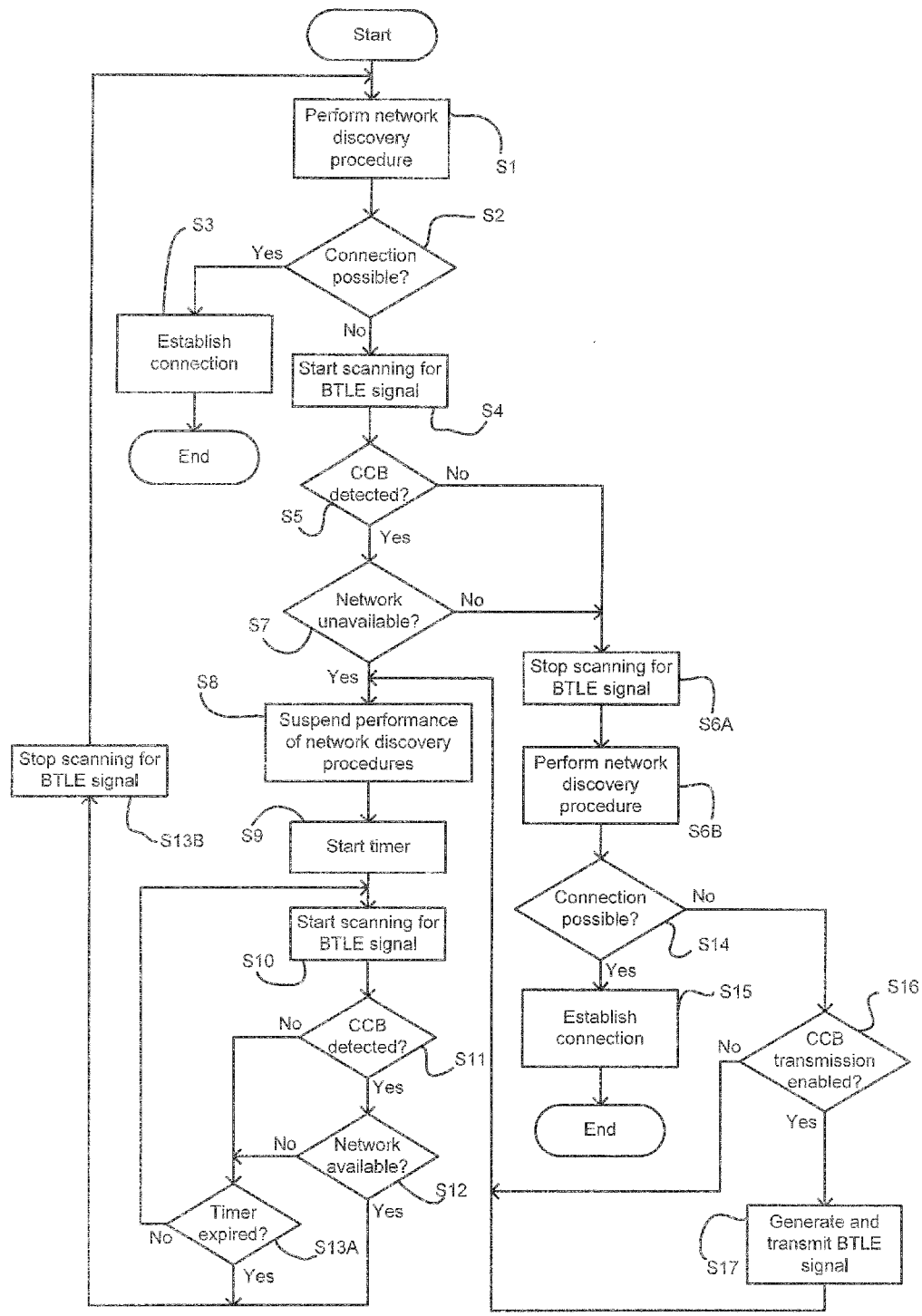
FIG. 2 is a flow chart depicting a method according to example embodiments.

FIG. 2 is a flow chart illustrating methods according to various example embodiments.

In step S1, the controller 10 causes a network discovery procedure to be performed. In embodiments in which the network discovery is performed in respect of a cellular network, the network discovery procedure may comprise transmitting one or more Random Access Preamble (RAP) and subsequently waiting for one or more Random Access Responses (RAR).

In step S2, it is determined if a connection with a network can be established. This step may comprise determining whether or not an RAR in respect of an associated network has been received. As described above an associated network is one to which the mobile device 2 is permitted to connect.

If it is determined that a connection with a detected network is possible, the method proceeds to step S3, in which the connection with the network is established. Subsequent to this the method ends.

If, in step S2, it is determined that a connection with a network is not possible, for example because an RAR in respect of an associated network is not received, the method proceeds to step S4. In step S4, the controller 10 causes a scan for BTLE signals to be started.

Subsequently, in step S5, it is determined whether a BTLE signal, which includes a parameter indicating the absence of one or more networks, is detected. In cellular network embodiments, step S5 may comprise determining if a CCB BTLE signal is detected.

Step S5 may comprise two separate sub-steps. Firstly, it is determined if any BTLE signal at all is detected. Secondly, if a BTLE signal is detected, it is determined whether the detected BTLE signal includes a parameter indicating the absence of coverage by at least one network. A negative determination in either of the sub-steps causes a negative determination to be produced at step S5.

If, in step S5, a BTLE signal which includes a parameter indicating the absence of coverage by at least one network is not detected (i.e. a negative determination is reached), the method proceeds to step S6A. In step S6A, the controller 10 causes the scan for BTLE signals to be stopped. Subsequently, the method proceeds to step S6B in which the controller 10 causes another network discovery procedure to be performed.

If in step S5, a BTLE signal which includes a parameter indicating the absence of coverage by at least one network (e.g. a CCB BTLE signal) is detected, the method proceeds to step S7. In step S7, the controller 10 determines if the parameter included in the BTLE signal indicates that at least one network with which the apparatus is associated is unavailable. For example, if we consider the example of Table 1 and assume the associated network for the mobile device is operated by operator A, it is determined whether or not the first bit in the CCB octet is a "one". If the first bit in the CCB octet is a one, it is determined that network coverage by operator A is unavailable, and so a positive determination is reached. If, however, the first bit in the octet is a "zero", it is determined that the network operated by operator A is available and so a negative determination is reached.

If, in step S7, it is determined that the parameter does not indicate an associated network as unavailable (i.e. a negative determination), the controller 10 proceeds to step S6A, in which the controller 10 causes the scan for BTLE signals to be stopped. Subsequently, in step S6B, the controller causes another network discovery procedure to be performed.

If it is instead determined that the network is unavailable, the controller 10 proceeds to step S8. In step S8, the controller 10 causes network discovery procedures to be suspended. Put another way, the controller 10 temporarily prevents performance of further network discovery procedures. In example embodiments in which the network is a cellular network, step S8 comprises suspending RA procedures.

In step S9, the controller starts a timer. This may be carried out substantially concurrently with step S8. In alternative embodiments, step S9 may comprise making a note of the time at which network discovery procedures are suspended.

Subsequently, in step S10, the controller 10 causes one or more scan for further BTLE signals to be started. Next, in step S11, the controller determines if a BTLE signal which includes a CCB parameter is detected. This step is substantially as described with respect to step S5.

If a BTLE signal including a CCB parameter is detected, the controller 10 proceeds to step S12. If a BTLE signal with a CCB parameter is not detected, the controller 10 proceeds to step S13A.

In step S12, it is determined whether the CCB parameter indicates that one or more network with which the mobile 2 device is associated, and which was determined in step S7 as being unavailable, is no longer unavailable. If so, the controller 10 proceeds to step S13B.

In step S13B, the controller 10 causes the scan for BTLE signals to be stopped. Subsequently, the method returns to step S1 and causes a network discovery procedure to be performed. For example, if the first bit of the CCB octet was a "one" in the BTLE signal detected in step S5 and is now a "zero", the controller 10 will determine that the network operated by operator A is no longer unavailable. If the mobile device is associated with (e.g. is permitted to connect with) the network operated by operator A, the method proceeds to step S1 and performs a network discovery procedure.

If, in step S12, it is determined that the network with which mobile device is associated is still unavailable, the method proceeds to step S13A.

In step S13A, controller 10 determines if a predetermined duration has elapsed since the suspension of network discovery procedures. In some examples, such as that shown in FIG. 2, step S13A comprises determining if the timer, which was started in step S9, has expired. If the duration has elapsed (e.g. the timer has expired), the method proceeds to step S13B in which the controller 10 causes the scan for BTLE signals to be stopped. Subsequently, the method returns to step S1, in which the controller 10 causes a network discovery procedure to be performed. If, however, it is determined that the timer has not expired, the scan for BTLE signals is continued and the method returns to step S11 in which it is determined if a BTLE signal including a CCB parameter has been detected.

In some examples, the duration of step S13A may be selected at random from a range between a maximum duration and a minimum duration. This ensures that, if several devices are operating in accordance with embodiments of the invention and they all use the same reference time (e.g. GPS time), the duration for each device will be different. This avoids the synchronisation of the network discovery procedure of step S1 by all mobile devices.

Returning now to step S6B, subsequent to performing the network discovery procedure, the controller 10 proceeds to step S14. In step S14, it is determined whether it is possible to connect to a network. Step S14 is substantially the same as step S2.

If it is determined in step S14 that a connection with a network is possible, the method proceeds to step S15 in which the connection is established. If, however, it is determined that a connection is not possible, the method proceeds to step S16.

In step S16, the controller 10 determines whether generation and transmission of BTLE signals indicating the unavailability of at least one network is enabled. In some examples, enabling of this functionality may a user-settable option. Put another way, this functionality may be optional. In other examples, this functionality may be always enabled. In such cases, the method may omit the decision of step S16 and may proceed straight to step S17. In yet other examples, the device 2 may not provide this functionality, in which case the method may proceed from a negative determination in step S14 to step S4 or step S8. In such examples, steps S16 and S17 may be omitted from the method altogether.

Following a positive determination in step S16, the method proceeds to step S17. Following a negative determination in step S16 (i.e. a determination that the generation and transmission of BTLE signals indicating the absence of a network is not enabled), the method proceeds to step S8.

In step S17, the controller 10 causes a BTLE signal to be generated and transmitted. The BTLE signal includes a parameter indicating that one or more networks are unavailable. In examples in which the networks are cellular networks, the controller 10 may identify those networks which are not available by comparing a pre-stored list of known networks with networks from which an RAR is received during the network discovery procedure of step S6B. For example, let us assume that the mobile device is associated with the network provided by operator A, but is aware of all networks mentioned in Table 1 (i.e. those networks operated by operators A to E). If the mobile device 2 receives an RAR from the networks operated by operators B and C but not from the networks operated by operators A, D and E, the mobile device 2 is unable to connect to a network (e.g. because it is only permitted to connect to operator A's network). As such, the controller 10 can determine that operator A's network is unavailable. It can also determine that the networks provided by operators D and E are also unavailable because they are included in the list of known networks but no RAR identifying those networks was received. In response to this the controller 10 prepares a CCB octet for inclusion in a BTLE signal in which the first, fourth and fifth bits of the octet are "ones" and the remaining bits are "zeros". This BTLE signal is then caused to be transmitted thereby allowing nearby mobile devices to determine that the networks operated by operators A, D and E are unavailable. As such, if the nearby devices are associated with those networks, they can discontinue network discovery procedures and thereby conserve battery power.

The controller 10 causes the BTLE signals to be generated and transmitted for a predetermined duration, after which the generation and transmission of BTLE signals is stopped. This length of the predetermined duration for may be a user-settable option. The generation and transmission of BTLE signals may or may not be ongoing when the controller 10 performs steps S8 and S9, but step S10 is performed only after the generation and transmission of BTLE signals has been stopped.

Although in the above example the controller 10 is configured to generate and transmit BTLE signals indicating the absence or otherwise of plural networks, in other examples, the controller 10 may instead be configured to indicate the absence of only those networks with which it is associated.

Subsequent to step S17, the method proceeds to step S8.

It will of course be appreciated that the method shown in FIG. 2 is an example only. As such, in other examples various steps may be omitted and/or other steps may be performed in a different order to that shown in FIG. 2. For example, the method may omit steps S1 to S3 and so may commence with step S4. As such, the controller 10 may initially scan for a CCB BLTE signal and may perform network discovery procedures only if a relevant CCB BLTE is not detected. In other examples, the method may start with steps S6B and S15 to S17.

Figure 3:
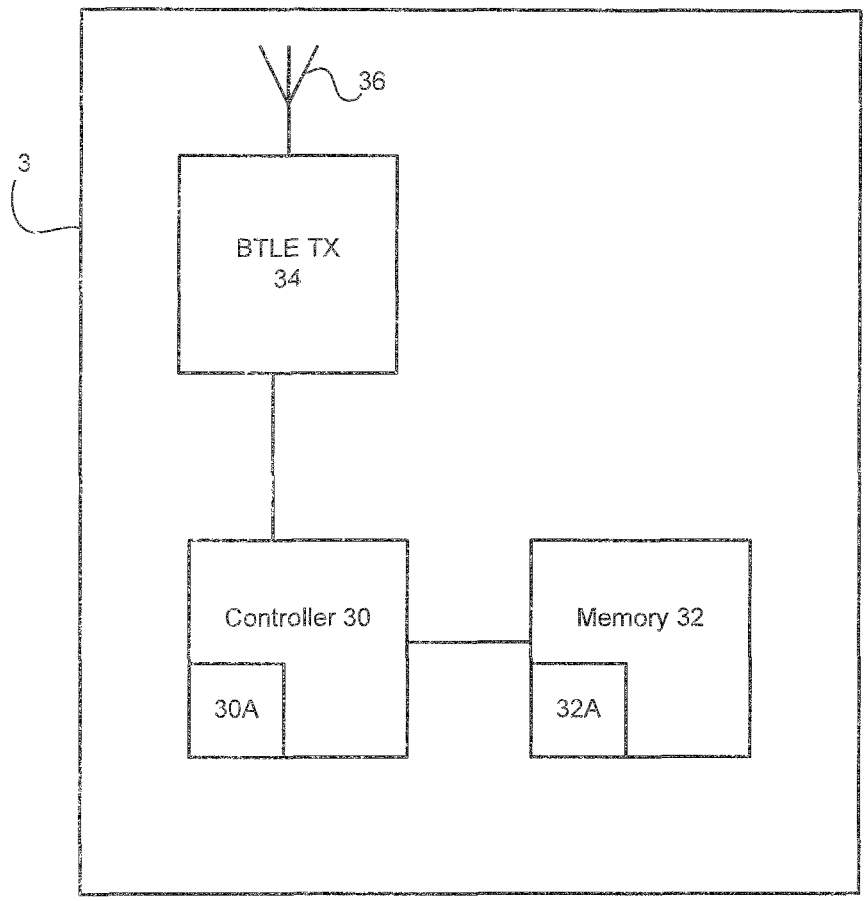
FIG. 3 is a schematic diagram of a device according to example embodiments.

FIG. 3 is a schematic illustration of a device 3 that is configured to emit BTLE signals indicating that coverage by one or more networks is not available. The device 3 comprises a controller 30 and one or more memory 32 comprising computer-readable code 32A. The device 3 also comprises a BTLE transmitter 34 and an associated antenna 36. The controller 30 comprises at least one processor 30A which is operable to execute computer readable code 32A stored in the at least one memory 32. The controller 30 is operable, under the control of the computer readable code 32A to control the BTLE transmitter 34 and the antenna 36 to transmit BTLE signals which indicate the absence of coverage by one or more networks. The one or more networks may be cellular networks, and the BTLE transmissions may be for reception by mobile devices, such as mobile telephones that are operable to communicate using cellular and BTLE protocols. The at least one processor 30A may comprise any suitable type, or any combination of suitable types, of processor or microprocessor. The controller 30 may also comprise one or more application specific integrated circuits (not shown). The at least one memory 32 may comprise any suitable type, or any combination of suitable types of memory medium. Suitable types of memory medium include, but are not limited to ROM, RAM and flash memory. The device 3 may be powered by a small battery, such as a coin cell battery (not shown). The device 3 may be located in areas in which one or more networks are unavailable and may be configured to emit BTLE signals including a CCB parameter (for example, as described with reference to Table 1).

The device 3 may be configured to transmit BTLE signals at intervals of, for example, 200 ms. Such devices are relatively small and so are easy to secrete in areas in which network coverage is not available. In addition, as the devices are not complex, they are relatively cheap to manufacture.

Figure 4:
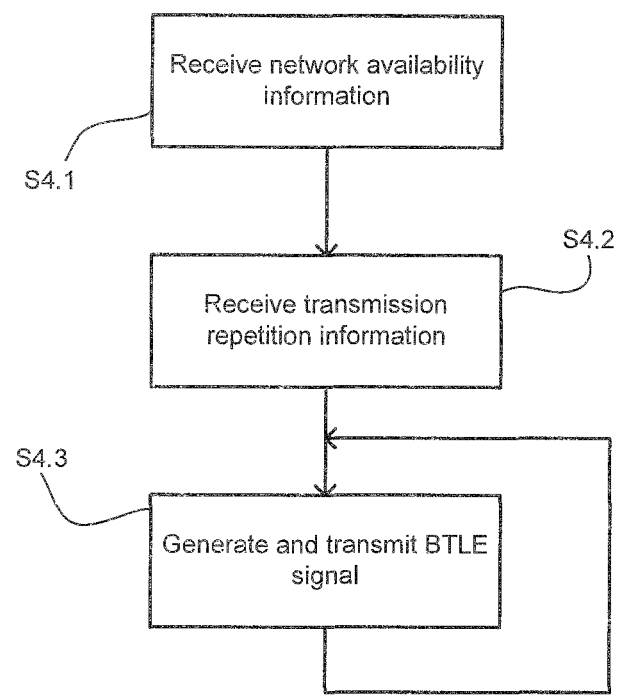
FIG. 4 is a flow chart depicting another method according to example embodiments.

FIG. 4 is a flow chart depicting an example method that may be performed by the device 3 of FIG. 3.

In step S4.1, the device receives network availability information, which is stored in the memory 32. In examples in which the device 3 is configured to indicate the availability of one or more cellular network, the network availability information may include a CCB octet as described above with reference to Table 1.

Next, in step S4.2, device receives transmission repetition information. This information indicates how often the device should transmit a BTLE signal including the availability, or otherwise, of the at least one network. The information received by the device 3 in steps S4.1 and S4.2 may be provided during manufacture of the device or may be provided by an engineer during installation.

Subsequently, in step S4.3, the device generates and transmits a BTLE signal, which includes the network availability information provided in step S4.3. After this the device periodically repeats S4.3 at times in accordance with the transmission repetition information received in step S4.2.

It will of course be appreciated that example embodiments may be utilised with types of network other than cellular networks. For example, BTLE signals may be used to indicate the absence of network coverage by one or more WIFI networks. In this way a mobile device can suspend discovery procedures in respect of one or more WIFI networks, if the BTLE signal indicates the absence of such. In other embodiments, the BTLE signals may indicate the absence of coverage by networks of more than one different type. For example, the BTLE signals may indicate the absence of one or more cellular networks and one or more WIFI networks. In such examples, two different octets may be used to indicate the absence of network coverage: one octet indicating the availability of networks of a first type (such as cellular networks) and the other indicating the availability of networks of a second type (such as WIFI networks). In other examples, a single octet may be used to indicate the availability of both types of networks.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

What is claimed is:

1. A method comprising:
   scanning for a Bluetooth Low Energy data signal; and
   if a Bluetooth Low Energy data signal is detected, responding to detection of the Bluetooth Low Energy data signal by suspending the performance of wireless network discovery procedures in respect of at least one network operating using a protocol other than Bluetooth Low Energy without establishing a connection with a device that transmitted the Bluetooth Low Energy data signal.

2. The method of claim 1, wherein the Bluetooth Low Energy data signal indicates the absence of the at least one network.

3. The method of claim 1, comprising:
   examining the Bluetooth Low Energy data signal for the presence of a parameter, the parameter indicating the absence of at least one network; and
   suspending the performance of network discovery procedures only if the parameter is present in the data signal and indicates the absence of a network with which a connection is permitted.

4. The method of claim 1, comprising:
   scanning for the Bluetooth Low Energy data signal in response to a failure to connect to a network following performance of a network discovery procedure in respect of the at least one network.

5. The method of claim 1, comprising:
   if a Bluetooth Low Energy data signal is not detected, causing performance of a wireless network discovery procedure in respect of at least one network operating using a protocol other than Bluetooth Low Energy.

6. The method of claim 5, comprising:
   responding to a failure to connect to a network following the performance of the network discovery procedure by causing generation and transmission of a Bluetooth Low Energy data signal, the transmitted Bluetooth Low Energy data signal indicating absence of the at least one network.

7. The method of claim 1, comprising:
   subsequent to suspending the performance of wireless network discovery procedures, responding to detection of a subsequent Bluetooth Low Energy data signal indicating the presence of the at least one network by causing performance of a network discovery procedure in respect of the at least one network.

8. The method of claim 1, comprising:
   subsequent to suspending the performance of wireless network discovery procedures, responding to expiration of a duration by causing performance of a network discovery procedure in respect of the at least one network.

9. The method of claim 1, wherein each network discovery procedure is a random access procedure in respect of at least one cellular network.

10. Apparatus comprising at least one processor and at least one non-transitory memory medium, the at least one non-transitory memory medium having stored thereon computer-executable code which, when executed by the at least one processor, causes the apparatus:
    to cause a scan for a Bluetooth Low Energy data signal to be performed; and
    if a Bluetooth Low Energy data signal is detected, to respond to detection of the Bluetooth Low Energy data signal by causing suspension of the performance of wireless network discovery procedures in respect of at least one network operating using a protocol other than Bluetooth Low Energy without establishing a connection with a device that transmitted the Bluetooth Low Energy data signal.

11. The apparatus of claim 10, wherein the Bluetooth Low Energy data signal indicates the absence of the at least one network.

12. The apparatus of claim 10, wherein the computer-executable code, when executed by the at least one processor, causes the apparatus:
    to examine the Bluetooth Low Energy data signal for the presence of a parameter, the parameter indicating the absence of at least one network; and
    to suspend the performance of network discovery procedures only if the parameter is present in the data signal and indicates the absence of a network with which a connection is permitted.

13. The apparatus of claim 10, wherein the computer-executable code, when executed by the at least one processor, causes the apparatus:
    to cause the scan for the Bluetooth Low Energy data signal to be performed in response to a failure to connect to a network following performance of a network discovery procedure in respect of the at least one network.

14. The apparatus of claim 10, wherein the computer-executable code, when executed by the at least one processor, causes the apparatus:
    if a Bluetooth Low Energy data signal is not detected, to cause performance of a wireless network discovery procedure in respect of at least one network operating using a protocol other than Bluetooth Low Energy.

15. The apparatus of claim 14, wherein the computer-executable code, when executed by the at least one processor, causes the apparatus:
    to respond to a failure to connect to a network following the performance of the network discovery procedure by causing generation and transmission of a Bluetooth Low Energy data signal, the transmitted Bluetooth Low Energy data signal indicating absence of the at least one network.

16. The apparatus of claim 10, wherein the computer-executable code, when executed by the at least one processor, causes the apparatus:
    subsequent to suspending the performance of wireless network discovery procedures, to respond to detection of a subsequent Bluetooth Low Energy data signal indicating the presence of the at least one network by causing performance of a network discovery procedure in respect of the at least one network.

17. The apparatus of claim 10, wherein the computer-executable code, when executed by the at least one processor, causes the apparatus:
    subsequent to suspending the performance of wireless network discovery procedures, to respond to expiration of a duration by causing performance of a network discovery procedure in respect of the at least one network.

18. The apparatus of claim 10, wherein each network discovery procedure is a random access procedure in respect of at least one cellular network.

19. Apparatus comprising at least one processor and at least one non-transitory memory medium, the at least one non-transitory memory medium having stored thereon computer-executable code which, when executed by the at least one processor, causes the apparatus:
    to cause generation and transmission of a Bluetooth Low Energy non-connectable undirected advertising message, the generated and transmitted Bluetooth Low Energy advertising message indicating the absence of at least one network which operates using a protocol other than Bluetooth Low Energy.

20. The apparatus of claim 19, wherein the computer-executable code, when executed by the at least one processor, causes the apparatus:

to cause the generation and transmission of the Bluetooth Low Energy advertising message in response to a determination, based on an unsuccessful network discovery procedure, that the at least one network, which operates using a protocol other than Bluetooth Low Energy, is absent.

\* \* \* \* \*